US009606017B2

(12) United States Patent
Adler et al.

(10) Patent No.: US 9,606,017 B2
(45) Date of Patent: Mar. 28, 2017

(54) METHOD AND DEVICE FOR DETERMINING AN ERROR IN A PRESSURE MEASUREMENT IN A PRESSURE RESERVOIR

(71) Applicant: Continental Automotive GmbH, Hannover (DE)

(72) Inventors: Christoph Adler, Regensburg (DE); Hans Riepl, Hemau (DE)

(73) Assignee: CONTINENTAL AUTOMOTIVE GMBH, Hannover (DE)

( * ) Notice: Subject to any disclaimer, the term of this patent is extended or adjusted under 35 U.S.C. 154(b) by 832 days.

(21) Appl. No.: 13/777,349

(22) Filed: Feb. 26, 2013

(65) Prior Publication Data
US 2013/0226474 A1    Aug. 29, 2013

(30) Foreign Application Priority Data

Feb. 29, 2012    (DE) .................. 10 2012 203 097

(51) Int. Cl.
*G01F 17/00* (2006.01)
*G01F 23/00* (2006.01)
(Continued)

(52) U.S. Cl.
CPC .......... *G01L 27/007* (2013.01); *F02D 41/222* (2013.01); *F02D 41/3836* (2013.01);
(Continued)

(58) Field of Classification Search
CPC ..... G01L 27/00; G01L 27/007; G01D 18/008; F02D 41/222; F02D 41/3836; F02D 2041/223
See application file for complete search history.

(56) References Cited

U.S. PATENT DOCUMENTS 5,220,898 A * 6/1993 Kidokoro ............... F02M 25/08
123/519
5,560,340 A * 10/1996 Tomisawa ............. F02M 69/54
123/494
(Continued)

FOREIGN PATENT DOCUMENTS

CN    101372920 A    2/2009    ............. F02D 41/04
DE    10003906 A1    8/2001    ............. F02D 41/24
(Continued)

OTHER PUBLICATIONS

Chinese Office Action, Application No. 201310063754.7, 13 pages.

*Primary Examiner* — Mohamed Charioui
*Assistant Examiner* — Leonard S Liang
(74) *Attorney, Agent, or Firm* — Slayden Grubert Beard PLLC

(57) ABSTRACT

A method for determining an error in a pressure, which is measured by means of a pressure sensor in a pressure accumulator for accumulating fuel that can be let out of the pressure accumulator via an injection valve and injected into a cylinder, wherein the method comprises: determining at least two 3-tuples of a first pressure, a period of time, and a second pressure, wherein each first pressure is measured by the pressure sensor; wherein after measuring each first pressure, the valve is opened for a period of time; and wherein after the opening of the valve for the period of time, the second pressure is measured by the pressure sensor; and determining the error of the measured pressure from the at least two 3-tuples.

14 Claims, 2 Drawing Sheets

(51) Int. Cl.
*G01L 7/00* (2006.01)
*G01N 11/00* (2006.01)
*G01F 1/00* (2006.01)
*G01F 7/00* (2006.01)
*G01L 27/00* (2006.01)
*F02D 41/22* (2006.01)
*F02D 41/38* (2006.01)
*G01D 18/00* (2006.01)

(52) U.S. Cl.
CPC ........ *G01L 27/00* (2013.01); *F02D 2041/223* (2013.01); *G01D 18/008* (2013.01)

(56) References Cited

U.S. PATENT DOCUMENTS

| | | | | |
|---|---|---|---|---|
| 5,642,716 A * | 7/1997 | Ricco | F02D 41/3809 | 123/447 |
| 5,698,780 A * | 12/1997 | Mizutani | F02D 41/222 | 73/114.33 |
| 5,708,202 A * | 1/1998 | Augustin | F02D 41/221 | 73/114.43 |
| 5,723,780 A * | 3/1998 | Miwa | F02D 41/22 | 340/439 |
| 5,727,516 A * | 3/1998 | Augustin | F02D 41/22 | 123/198 DB |
| 5,773,716 A * | 6/1998 | Antonioli | F02B 77/08 | 701/103 |
| 5,775,304 A * | 7/1998 | Kono | F02D 41/3082 | 123/357 |
| 5,808,189 A * | 9/1998 | Toyoda | F02D 41/222 | 73/114.37 |
| 5,816,220 A * | 10/1998 | Stumpp | F02D 35/025 | 123/198 DB |
| 5,975,056 A * | 11/1999 | Augustin | F02D 41/3809 | 123/300 |
| 6,012,438 A * | 1/2000 | Joos | F02D 41/1454 | 123/198 D |
| 6,047,682 A * | 4/2000 | Fujino | F02D 41/3809 | 123/357 |
| 6,053,147 A * | 4/2000 | Hemmerlein | F02D 41/222 | 123/198 D |
| 6,085,727 A * | 7/2000 | Nakano | F02D 41/1401 | 123/447 |
| 6,234,148 B1 * | 5/2001 | Hartke | F02D 41/222 | 123/198 D |
| 6,293,251 B1 * | 9/2001 | Hemmerlein | F02D 41/222 | 123/357 |
| 6,308,685 B1 * | 10/2001 | Becker | F02D 41/3029 | 123/447 |
| 6,363,922 B1 * | 4/2002 | Romzek | F02M 25/0702 | 123/568.16 |
| 6,389,901 B1 * | 5/2002 | Joos | F02D 41/22 | 73/714 |
| 6,439,190 B1 * | 8/2002 | Bochum | F02D 41/062 | 123/295 |
| 6,467,461 B1 * | 10/2002 | Becker | F02D 41/061 | 123/179.17 |
| 6,701,274 B1 * | 3/2004 | Eryurek | G01D 3/022 | 702/130 |
| 6,802,209 B2 | 10/2004 | Joos et al. | | 73/114.43 |
| 6,840,228 B2 * | 1/2005 | Yomogida | F02D 41/3836 | 123/447 |
| 7,810,386 B2 * | 10/2010 | Kraemer | F02D 41/222 | 73/114.43 |
| 7,865,293 B2 * | 1/2011 | Ishizuka | F02D 41/40 | 123/486 |
| 8,230,735 B2 * | 7/2012 | Chouzenoux | G01F 1/44 | 702/100 |
| 8,738,218 B2 * | 5/2014 | Suda | F02D 41/20 | 701/30.2 |
| 9,200,975 B2 * | 12/2015 | Hattar | F02D 41/222 | |
| 2002/0043248 A1 * | 4/2002 | Kojima | F02D 41/3836 | 123/456 |
| 2002/0139350 A1 * | 10/2002 | Barnes | F02D 41/1401 | 123/456 |
| 2002/0162536 A1 * | 11/2002 | Steinbrenner | F02D 41/3836 | 123/446 |
| 2004/0007213 A1 * | 1/2004 | Oono | F02D 41/2438 | 123/495 |
| 2006/0080028 A1 * | 4/2006 | Moser | F01N 3/035 | 701/114 |
| 2006/0259227 A1 * | 11/2006 | Fritsch | F02D 41/2422 | 701/104 |
| 2006/0277907 A1 * | 12/2006 | Ueda | F02B 37/16 | 60/601 |
| 2007/0006851 A1 * | 1/2007 | Okamura | F02D 41/40 | 123/478 |
| 2007/0113634 A1 * | 5/2007 | Kimura | F02M 25/0818 | 73/114.39 |
| 2007/0124183 A1 * | 5/2007 | Williams | F02D 41/1401 | 701/103 |
| 2007/0272213 A1 * | 11/2007 | Gibson | F02M 47/027 | 123/446 |
| 2008/0027624 A1 * | 1/2008 | Kloos | F02D 41/3836 | 701/103 |
| 2008/0210200 A1 * | 9/2008 | Cwielong | F02D 41/1401 | 123/459 |
| 2008/0228374 A1 * | 9/2008 | Ishizuka | F02D 41/3809 | 701/103 |
| 2008/0236547 A1 * | 10/2008 | Takahashi | F02D 41/2467 | 123/447 |
| 2009/0007647 A1 * | 1/2009 | Kraemer | F02D 41/222 | 73/114.43 |
| 2010/0058743 A1 * | 3/2010 | Tsukada | F01N 3/0253 | 60/287 |
| 2010/0088006 A1 * | 4/2010 | Ito | F02D 41/2096 | 701/103 |
| 2010/0274462 A1 * | 10/2010 | Wang | F02M 63/022 | 701/102 |
| 2010/0280741 A1 * | 11/2010 | Wang | F02D 41/222 | 701/103 |
| 2011/0010078 A1 * | 1/2011 | Prodi | F02D 41/123 | 701/106 |
| 2011/0022290 A1 * | 1/2011 | Kaneko | F02D 41/222 | 701/103 |
| 2011/0208396 A1 * | 8/2011 | Otanez | F16D 48/02 | 701/67 |
| 2012/0024263 A1 * | 2/2012 | Melis | F02D 41/3836 | 123/456 |
| 2012/0042853 A1 * | 2/2012 | Sakata | F02D 41/3863 | 123/447 |
| 2012/0215424 A1 * | 8/2012 | Dolker | F02B 75/22 | 701/104 |
| 2012/0255348 A1 * | 10/2012 | Hermes | F02D 31/008 | 73/114.43 |
| 2012/0265424 A1 * | 10/2012 | Dolker | F02D 41/222 | 701/104 |
| 2013/0013175 A1 * | 1/2013 | Nistler | F02D 41/22 | 701/112 |
| 2014/0048038 A1 * | 2/2014 | Yasuda | F02D 35/023 | 123/395 |

FOREIGN PATENT DOCUMENTS

| | | | | |
|---|---|---|---|---|
| DE | 10035816 A1 | 1/2002 | ............ | F02D 41/24 |
| DE | 10137871 C1 | 3/2003 | ............ | F02B 77/08 |
| DE | 112008000659 T5 | 1/2010 | ............ | F02D 41/22 |
| WO | 2008/111899 A1 | 9/2008 | ............ | F02D 41/22 |

* cited by examiner

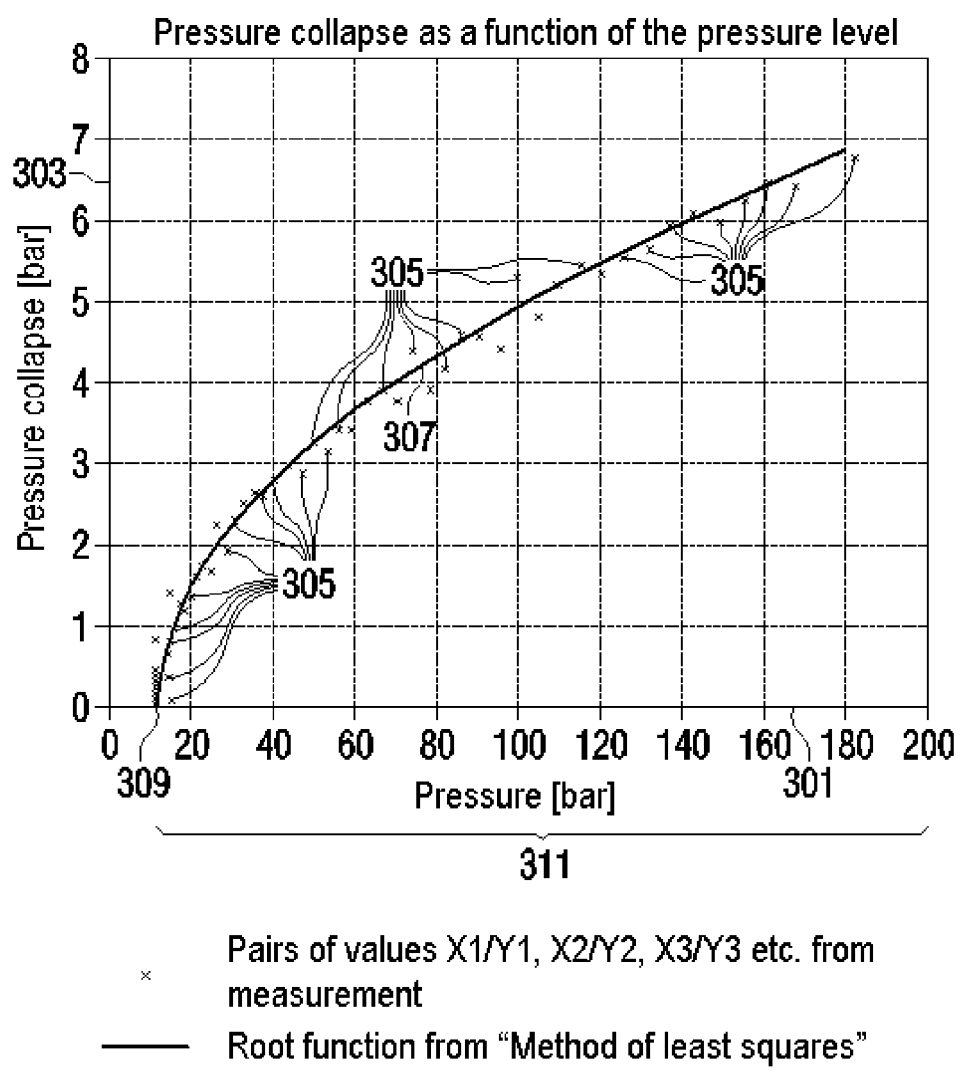

METHOD AND DEVICE FOR DETERMINING AN ERROR IN A PRESSURE MEASUREMENT IN A PRESSURE RESERVOIR

CROSS-REFERENCE TO RELATED APPLICATIONS

This application claims priority to DE Patent Application No. 10 2012 203 097.2 filed Dec. 29, 2011. The contents of which is incorporated herein by reference in its entirety.

TECHNICAL FIELD

The present disclosure relates to a method and to a device for determining an error in a pressure, which is measured by means of a pressure sensor, in a pressure accumulator for accumulating fluid which can be let out of the pressure accumulator via a valve. Furthermore, the present disclosure relates to an engine control system which either comprises a device of this type or communicates with a device of this type in order thereby more effectively to activate an internal combustion engine.

BACKGROUND

A car which has an internal combustion engine also comprises a pressure accumulator (also called common rail) in order to accumulate fuel and to be able to inject the fuel into one or more cylinders in a controlled manner.

A customary common rail system comprises, inter alia, the following components:
- a pressure accumulator (common rail) which stores fuel under a certain pressure,
- a high pressure pump which supplies fuel to the pressure accumulator,
- corresponding valves which can be activated by an engine control system and which enable the pressure in the common rail to be regulated via a manipulation of the fuel inflow into the pressure accumulator or of the fuel outflow from the pressure accumulator,
- a pressure sensor which measures the current pressure in the common rail (referred to below as rail pressure) and which can optionally indicate an erroneous value,
- one or more injection valves (injectors) which connect the common rail to one cylinder each of the internal combustion engine and which can be opened and closed by an engine control system. In the open state, the pressure differential between the common rail and the cylinder causes a certain quantity of fuel to be injected into the cylinder, wherein said quantity of fuel depends on the opening duration of the injectors and the rail pressure,
- optionally a lambda sensor,
- a motor control system which, inter alia,
  1. predefines a desired value for the rail pressure for the current operating state of the engine,
  2. ascertains the rail pressure P with the aid of the pressure sensor,
  3. compares the desired pressure value with the actual value P and, by means of a suitable control algorithm and corresponding activation of the above-described valves, attempts to adjust the pressure measured to the corresponding desired value,
  4. calculates the quantity of fuel M to be injected for the current operating state of the engine,
  5. calculates, at least from the parameters M and P, an opening duration t of the injectors that is suitable for also actually realizing the desired quantity M.

The pressure sensor therefore has the task of measuring the current rail pressure P and of making it available to the engine control system. The latter, using this measured value, ascertains the parameters required for realizing the predefined quantity of fuel to be injected. A pressure sensor which is inaccurate (for example due to drift effects) can therefore result in inaccurate injections. In order to reduce this risk, a regular plausibility check of the value ascertained by the sensor is required.

According to legal stipulations, sensors in a car have to be subjected to a plausibility test in order to check the correct functioning of the sensors. In particular, a plausibility test of the pressure sensor in the pressure accumulator is known.

For the plausibility check of the pressure sensor, conventionally the two methods below are primarily customary:

The first method evaluates the measured value of the pressure system in states of the hydraulic system, in which the actual pressure has to be zero (for example a sufficient interval after the high pressure pump has been switched off). If, nevertheless, the pressure sensor supplies a value which is different from zero, it can be concluded that there is an error in the sensor. A disadvantage of this method is that said method is sensitive only for measuring the zero points of pressure. Errors which do not change the zero point therefore cannot be detected.

The second method is used primarily in systems having a lambda sensor (in particular petrol engines). Use is made here of the fact that, in the event of an error of measurement of the rail pressure, the injection valves are opened for a longer or shorter time than would be required in order to achieve the desired quantity of fuel to be injected. The quantity actually injected therefore does not match the provided quantity of air. As a result, lambda will differ from the target value. A disadvantage of this method (inter alia) is that the sensitivity of said method decreases with increasing pressure. Errors of measurement of the pressure sensor that result primarily at higher pressures are therefore not detectable therewith.

SUMMARY

One embodiment provides a method for determining an error in a pressure, which is measured by means of a pressure sensor, in a pressure accumulator for accumulating fluid, in particular fuel, which can be let out of the pressure accumulator via a valve, in particular an injection valve, and, in particular, can be injected into a cylinder, wherein the method comprises: determining at least two 3-tuples of a first pressure, of a period of time and of a second pressure, wherein the first pressure is in each case measured by the pressure sensor; wherein in each case, after measuring of the first pressure, the valve is opened for a period of time; wherein in each case, after the opening of the valve for the period of time, the second pressure is measured by the pressure sensor; and determining the error of the measured pressure from the at least two 3-tuples.

In a further embodiment, the determination of the error comprises determining parameters of an error model.

In a further embodiment, the error model assumes that $P'=a+b*P$, wherein $P'$ is the measured pressure, $P$ is the actual pressure, and $a$, $b$ are parameters to be determined.

In a further embodiment, the parameters of the error model are determined by matching at least two pairs of measured values to a functional relationship between pressure collapse and pressure, wherein a pair of measured values is formed for each 3-tuple, wherein one component of the pair of measured values depends on the first and/or the second pressure and another component of the pair of measured values depends on the difference between the first pressure and the second pressure.

In a further embodiment, the functional relationship is determined as a function of a characteristic of the valve, wherein the characteristic defines a required opening time for a given mass of the fluid that is to be let out, said fluid in the pressure reservoir being under a given pressure in relation to an external space.

In a further embodiment, the functional relationship is given by:

$$(V*\rho*(P1-P2))/(f(t)*E)=b*g((P1-a)/b),$$

wherein
P1 is the first pressure,
P2 is the second pressure,
V is the volume of the pressure accumulator,
ρ is the mass density of the fluid,
E is the bulk modulus of the fluid,
f(t) and g(P) are real-value functions, wherein g(P) is in particular known as a mathematical function and f(t) is known at least by pairs of values, and
wherein f(t)*g(P) indicates the mass of fluid that is let out of the pressure reservoir at a pressure P in the pressure reservoir, relative to an external pressure, by opening of the valve for a duration t, and wherein the duration t is in each case identical to the period of time for which the valve is opened after measuring of the first pressure.

In a further embodiment, g(P)=−sqrt (P).

In a further embodiment, the functional relationship is provided by:

$$(V*\rho*(P1-P2))/E=b*gt((P1-a)/b),$$

wherein
P1 is the first pressure,
P2 is the second pressure,
V is the volume of the pressure accumulator,
ρ is the mass density of the fluid,
E is the bulk modulus of the fluid,
gt(P) is a real-value function which indicates the mass of fluid that is let out of the pressure reservoir at a pressure P in the pressure reservoir, relative to an external pressure, by opening of the valve for a predefined period, and
wherein in each case the period of time for which the valve is opened after measuring of the first pressure is equal to the predefined duration.

In a further embodiment, a pressure dependency of the mass density (ρ) of the fluid and/or of the bulk modulus (E) of the fluid is taken into consideration.

Another embodiment provides a device for determining an error in a pressure, which is measured by means of a pressure sensor, in a pressure accumulator for accumulating fluid, in particular fuel, which can be let out of the pressure accumulator via a valve, in particular an injection valve, and, in particular, can be injected into a cylinder, wherein the device comprises: a signal input in order in each case to receive a measuring signal of the first pressure measured by the pressure sensor; a control output in order in each case, after measuring of the first pressure, to send a control signal to the valve in order to open the valve for a period of time, wherein in each case, after the opening of the valve for the period of time, a measuring signal of the second pressure measured by the pressure sensor is received by the signal input; and a processor which is designed to determine the error of the measured pressure from at least two 3-tuples, wherein each 3-tuple in each case comprises the first pressure measured, the period of time and the second pressure measured.

Another embodiment provides an engine control system which comprises the device as claimed in the preceding claim or communicates with the device as claimed in the preceding claim, wherein the engine control system is designed to activate the valve as a function of the determined error in such a manner that a desired quantity of fluid is let out of the pressure accumulator, and that, in particular, a desired quantity of fuel is injected into the cylinder, wherein, in particular, a required opening time of the injection valve is determined.

BRIEF DESCRIPTION OF THE DRAWINGS

Exemplary embodiments will be explained in more detail below based on the schematic drawings, wherein:

FIG. 3 illustrates a graph which is evaluated according to a method for determining an error in a pressure, which is measured by means of a pressure sensor, according to an example embodiment of the present disclosure in order to determine an error in the pressure measured.

DETAILED DESCRIPTION

Figure 1:
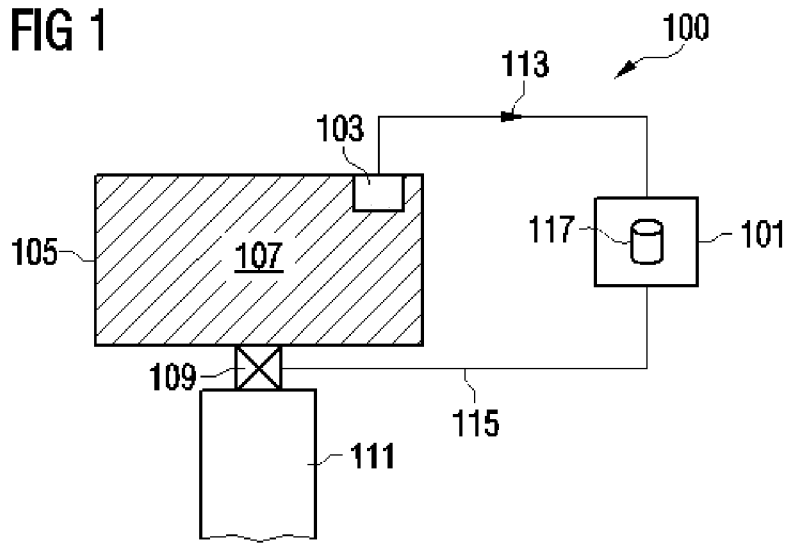
FIG. 1 shows schematically a device for determining an error in a pressure, which is measured by means of a pressure sensor, in accordance with an example embodiment of the present disclosure together with a pressure reservoir, an injection valve and a cylinder.

Embodiments of the present disclosure provide a method and a device which can determine an error in a measured pressure in a pressure accumulator in order therefore in particular to be able to implement an engine control system with greater accuracy and better effectiveness. Some embodiments provide a method for determining an error in a measured pressure, in which method the error can be determined over a large range of a measurable pressure, and therefore an engine control system can also be implemented with greater accuracy at different pressures within the pressure accumulator.

Some embodiments provide a method for determining an error in a pressure, which is measured by means of a pressure sensor, in a pressure accumulator for accumulating fluid, in particular fuel, which can be let out of the pressure accumulator via a valve, in particular an injection valve, and, in particular, can be injected into a cylinder, wherein the method comprises: determining at least two 3-tuples (or more than 3-tuples, for example 10 to 500, in particular 20 to 100) of a first pressure, of a period of time and of a second pressure, wherein the first pressure is in each case measured by the pressure sensor; wherein in each case, after measuring of the first pressure, the valve is opened for a period of time; wherein in each case, after the opening of the valve for the period of time, the second pressure is measured by the pressure sensor; and determining the error in measured pressure from the at least two 3-tuples.

In this case, the pressure sensor may comprise an actual pressure-sensitive sensor, lines, electronics, AD converters, etc.

A 3-tuple comprises the first pressure, a period of time and the second pressure in any order. The first pressure, the period of time and the second pressure, which are included in a 3-tuple, are therefore assigned alternately to one another. For each of the at least two 3-tuples, the first pressure is measured by the pressure sensor, after measuring of the first pressure, the valve is opened for the period of time and, after the opening of the valve for the period of time, the second pressure is in each case measured by the pressure gauge. In this case, the periods of time in the at least two 3-tuples can be different or identical. In particular, more than two 3-tuples can be measured, for example 5, 10, 50-100 or 50-1000 3-tuples. The greater the number of 3-tuples which are measured, the better the statistical error in the pressure measured can be reduced. For the determination of the error, the first pressure, the period of time and the second pressure of each 3-tuple measured are therefore taken into consideration. The first pressure can be different in the different 3-tuples in order to cover a certain pressure range as uniformly as possible.

For example, the first pressure can be set in each case by supplying the fluid to the pressure accumulator and removing the fluid from the pressure accumulator by means of a control valve. In particular, the first pressure of the at least two 3-tuples can be provided over a large pressure range, and therefore the first pressure covers a pressure range of, for example, 0 bar to 300 bar, in particular 0 bar to 200 bar. The error in the pressure sensor can therefore be determined for the entire pressure range. In particular, the measured pressure range or the error for a pressure range is determined, which pressure range corresponds to typical operating states of the pressure accumulator of a motor vehicle. The error in the measured pressure can therefore be determined over a large pressure range in order therefore also to improve an engine control system of the motor vehicle.

According to one embodiment, the determination of the error comprises determining parameters of an error model. Setting up an error model which is or can be parameterized by parameters can simplify a determination of the error. In particular, the error model can make it possible for different errors for different pressures to occur or be permitted during the pressure measurement. A multiplicity of typical error causes or error reasons can therefore be detected or modeled by the error model.

According to one embodiment, the error model assumes that:

$$P' = a + b*P, \text{ wherein}$$

P' is the measured pressure,
P is the actual pressure,
and a, b are parameters to be determined.

The measured pressure is therefore described by a shifting a in relation to the actual pressure and is linearly dependent on the actual pressure. The variables a and b can be constant parameters which can be determined from the 3-tuples. With knowledge of both a and b, firstly the pressure measured by the pressure sensor can be ascertained from the actual pressure or, secondly, the actual pressure can be derived from the pressure measured by the pressure sensor. The actual pressure can then be used, for example by an engine control system, for improved activation of an injection valve.

A simple error model is therefore provided, the error model only requiring the determination of two parameters a and b in order to determine the error. Different embodiments can be based on a different error model, for example an error model which has more than two parameters, for example an error model which describes the pressure measured as a polynomial of the actual pressure, or vice versa. In addition to a linear relationship, a square, cubic relationship, or a relationship of a higher order can therefore also be included.

According to one embodiment, the parameters of the error model are determined by matching (fit) at least two pairs of measured values to a functional relationship between pressure collapse and pressure, wherein a pair of measured values is formed for each 3-tuple, wherein one component of the pair of measured values depends on the first and/or the second pressure and another component of the pair of measured values depends on the difference between the first pressure and the second pressure.

In particular, the pair of measured values can be formed from the first pressure and a difference between the first pressure and the second pressure (or the second pressure and the first pressure). The functional relationship can be given by a mathematical formula. The functional relationship can also be given by pairs of values, for example by means of a table or a graph. The matching of the at least two pairs of measured values (or more than two pairs of measured values, for example 5-10, 10-100 or 50-1000 pairs of measured values) to the functional relationship can include solving of a minimal problem, for example the determination of the parameters in such a manner that a sum of distance measurements is minimal. In this case, for example, a Euclidean distance measurement can be used as a root of a sum of square errors.

The matching makes it possible easily to determine the parameters, wherein recourse may be made to known mathematical optimization methods. The method is therefore simplified.

According to one embodiment, the functional relationship is determined as a function of (or based on or taking into consideration) a characteristic of the valve (in particular an injection valve), wherein the characteristic defines a required opening time (of the valve) for a given mass of the fluid that is to be let out, said fluid in the pressure reservoir being under a given pressure (compared with a pressure in the external space or in a cylinder). For a certain predefined mass of the fluid that is to be let out of the pressure reservoir, in which the fluid is under a given pressure, the characteristic therefore makes it possible to determine the opening time which leads to the predefined mass of the fluid to be let out. The functional relationship can therefore be set up taking into consideration actual physical conditions, which can improve the accuracy of the method.

According to one embodiment, the functional relationship is given by:

$$(V*\rho*(P1-P2))/(f(t)*E) = b*g((P1-a)/b),$$

wherein
P1 is the first pressure,
P2 is the second pressure,
V is the volume of the pressure accumulator,
$\rho$ is the mass density of the fluid,
E is the bulk modulus of the fluid,
f(t) and g(P) are real-value functions, wherein g(P) is in particular known as a mathematical function and f(t) is, in particular, known at least by pairs of values,
wherein f(t)*g(P) indicates the mass of fluid that is let out of the pressure reservoir at a pressure P in the pressure reservoir, relative to an external pressure, by opening of the valve for a duration t, wherein the duration t is in each case identical to the period of time for which the valve is opened after measuring of the first pressure.

In this connection, in particular an inverse characteristic of the valve can be written as or assumed to be a product of f(t) and g(P). An advantage of this assumption is that the period of time for which the valve is opened after measuring of the first pressure can be different for different 3-tuples. The period of time used in each case has to be used as the duration t in the above equation. Given knowledge of the functions f(t) and g(P), the functional relationship is therefore entirely given by the difference between the first pressure and the second pressure and the first pressure.

The method can therefore be carried out in a simple manner.

According to one embodiment:

$$g(P)=-sqrt(P),$$

wherein sqrt denotes the square root function.

It is assumed in this case that the fluid is discharged from the pressure accumulator in accordance with Bernoulli's law. Inserting this formula into the above formula of the functional relationship further simplifies the functional relationship.

According to one embodiment, the functional relationship is provided by:

$$(V*\rho*(P1-P2))/E=b*gt((P1-a)/b), \text{ wherein}$$

P1 is the first pressure,
P2 is the second pressure,
V is the volume of the pressure accumulator,
$\rho$ is the mass density of the fluid,
E is the bulk modulus of the fluid,
gt(P) is a real-value function which indicates the mass of fluid that is let out of the pressure reservoir at a pressure P in the pressure reservoir, relative to an external pressure, by opening of the valve for a predefined period, wherein in each case the period of time for which the valve is opened after measuring of the first pressure is equal to the predefined duration.

In this case, it has not been assumed that the inverse characteristic can be factorized into a time-dependent and a pressure-dependent portion. Instead, for a fixed opening duration (which is equivalent to the period of time for which the valve is opened after measuring of the first pressure), the pressure dependency of the mass of the fluid that has been let out is known as gt(P). In this case, the period of time of various 3-tuples is always the same and specifically equals the predefined duration.

According to one embodiment, a pressure dependency of the mass density $\rho$ of the fluid, in particular of the fuel, and/or of the bulk modulus E of the fluid, in particular the fuel, is taken into consideration. The accuracy of the determination of the error can therefore be further improved.

Other embodiments provide a device for determining an error in a pressure, which is measured by means of a pressure sensor, in a pressure accumulator for accumulating fluid, in particular fuel, which can be let out of the pressure accumulator via a valve, in particular an injection valve, and, in particular, can be injected into a cylinder, wherein the device comprises: a signal input in order in each case to receive a measuring signal of the first pressure measured by the pressure sensor; a control output in order in each case, after measuring of the first pressure, to send a control signal to the valve in order to open the valve for a period of time, wherein in each case, after the opening of the valve for the period of time, a measuring signal of the second pressure measured by the pressure sensor is received by the signal input; and a processor which is designed to determine the error in the measured pressure from at least two 3-tuples, wherein each 3-tuple in each case comprises the first pressure measured, the period of time and the second pressure measured.

The device can be designed in particular to carry out the method according to one of the above-described embodiments.

It should be noted that features which have been mentioned, described or used individually or in combination in conjunction with a method for determining an error in a pressure, which is measured by means of a pressure sensor, are also applicable individually or in any combination to the device for determining an error in a pressure, which is measured by means of a pressure sensor, and vice versa.

Other embodiments provide an engine control system which comprises a device according to the above-described embodiment or communicates with the device, wherein the engine control system is designed to activate the valve as a function of the determined error in such a manner that a desired quantity (in particular mass) of fluid is let out of the pressure accumulator, and that, in particular, a desired quantity of fuel (or a mass of fuel) is injected into the cylinder, wherein, in particular, a required opening time of the injection valve is determined.

Furthermore, the engine control system can be designed to transmit a control signal to the injection valve, which control signal causes the injection valve to open for a required opening time.

In some embodiments, the injection of a certain quantity of fuel into the combustion chamber is carried out by an engine control system according to the following method:

a) ascertaining a desired value for the quantity of fuel M to be injected b) measuring the current fuel pressure P in the rail c) ascertaining a suitable opening duration t of the injectors from a component characteristic K:

$$t=K(M,P) \qquad (I)$$

d) opening the injector by means of a suitable activation signal of the duration t. An actual quantity of fuel of $$M=K^{-1}(t,P) \qquad (II)$$

is thereby injected.

According to one embodiment, the inverse component characteristic $K^{-1}$ (t, P) can be assumed to be a product of two factors:

$$K^{-1}(t,P)=f(t)*g(P) \qquad (III)$$

Under the assumption that the discharging of the fuel follows Bernoulli's law, it would appear, according to one embodiment, that g(P)=sqrt(P), i.e. is equal to the square root of the pressure. However, this behavior is not a compulsory prerequisite.

According to one embodiment, only the following assumptions apply:

The abovementioned factorization $$K^{-1}(t,P)=f(t)*g(P) \qquad (IV)$$

is correct as a good approximation.

The function g(P) is known as a function term (V)

The function f(t) is known (as pairs of values) (for example from measurements) (VI)

$$\text{Given } P=0, g(P=0)=0 \qquad (VII)$$

The last assumption is trivial. It merely states that without pressure there is also no injection.

In the event of injection, a certain quantity M of fuel is removed from the rail. This causes the pressure in the rail to drop by an amount $\Delta P$. The following is applicable for the relationship between M and $\Delta P$:

$$\Delta P = M*E/(V*\rho) \qquad (VIII)$$

In this case,
E denotes the bulk modulus of the fuel
V denotes the entire high pressure volume
$\rho$ denotes the density of the fuel With assistance of the equations (II) and (IV), the pressure collapse can be expressed as follows:

$$\Delta P = f(t)*g(P)*E/(V*\rho) \qquad (IX)$$

If the sensor has a defect and indicates a value P' instead of the actual pressure P, then, according to (I), a duration $t'=K(M, P')$ is ascertained instead. The quantity $M'=K^{-1}(t', P)$ actually realized as a result deviates from the desired quantity M.

According to one embodiment, the following is furthermore assumed:

Between two physical variables X and Y, a functional relationship in the form of a function term $$Y = F_{k1, k2, \ldots kn}(X) \qquad (X)$$

is known, the functional relationship depending, in addition to the variable X, also on further parameters k1, k2, . . . , kn, which are optionally initially unknown. If, however, adequately suitable pairs of values X1/Y1, X2/Y2, X3/Y3 etc. are available (for example from measurements), the parameters k1, k2, . . . , kn can be calculated by a suitable mathematical method. One such method is, for example, the "method of least squares (least squares fit)". As soon as the parameters are ascertained in this manner, the full functional relationship $Y = F_{k1, k2, \ldots kn}(X)$ is known and can be used, for example, for interpolations or extrapolations.

In this method, care should be taken to ensure that the pairs of values all have to relate to the same constant set of parameters k1, k2, . . . , kn. A variation in said parameters during the measurement is not permissible.

According to one embodiment, it is furthermore assumed that such a defect in the fuel pressure sensor only has the effect that the indicated erroneous sensor value P' is related to the actual pressure P via an offset and/or a gradient, i.e.

$$P' = a + b*P \qquad (XI)$$

The method depicted below is focused on ascertaining the parameters a and b. If the latter are known, the deviation in the sensor is also ascertained.

For (erroneous) pressure collapses measured (caused by injections), the following then applies $$\Delta P' = b*\Delta P \qquad (XII)$$

If equation (IX) is transferred to the variables which can be measured by means of the pressure sensor (i.e. XI and XII are inserted into IX), then the following is obtained:

$$\Delta P' = b*f(t)*g((P'-a)/b)*E/(V*\rho) \qquad (XIII)$$

or by transposition $$(V*\rho*\Delta P')/(f(t)*E) = b*g((P'-a)/b) \qquad (XIV)$$

Equation (XIII) describes the functional relationship between the (erroneously measured) pressure level P', at which an injection is carried out, and the associated (erroneously measured) pressure collapse in the rail $\Delta P'$. The constants a and b, and possibly further constants which are contained in the functions f and g, are initially unknown.

According to one embodiment, it is assumed as an alternative "without factorization" that the condition (IV) is not met, i.e. that the inverse component characteristic $K^{-1}(t, P)$ cannot be factorized into a time-dependent and a pressure-dependent portion. Instead, even in the case of a fixed opening duration of the injectors t, it suffices that the pressure dependency of $K^{-1}(t, P)$ is known as the function term, i.e.

$$K^{-1}(t,P) = gt(P) \qquad (III')$$

wherein the function term of gt(P) is known.

In this case, the injections all have to be carried out with the same opening duration t.

Equation (XIV) is then simplified to $$(V*\rho*\Delta P')/E = b*gt((P'-a)/b) \qquad (XIV')$$

The rest of the method remains unchanged.

According to one embodiment, it is assumed as an alternative "nonlinear sensor error" that the condition (XI) is not met, i.e. when the erroneous sensor value P' does not relate to the actual pressure P via an offset and/or a gradient, but rather has a more complex error picture.

For example, the sensor could be disturbed only at a particular point, for example within a certain pressure range, but could otherwise indicate correct values. Such an error picture would result in the abovementioned "method of least squares" only poorly functioning. The sum of the error squares would be large because the measured values can only poorly be described by the function term (i.e. by the theoretical model). If the sum of the error squares exceeds a threshold value, it could be concluded that there is an error. However, in this case, a correction of the error would no longer be possible.

A further explanation of embodiments is undertaken with reference to the figures.

FIG. 1 shows an arrangement 100 which can be included, for example, in a motor vehicle, wherein a device 101 according to one embodiment for determining an error in a pressure, which is measured by means of a pressure sensor 103, in a pressure accumulator 105 for accumulating fluid 107, in particular fuel, which can be let out via a valve 109 and can be injected into a cylinder 111 is included.

The pressure accumulator 105 contains fuel 107 which is to be injected into the cylinder 111 in a controlled manner, i.e. in a defined quantity or mass, via the injection valve 109. In this case, the mass of the injected fuel 107 depends in particular on the pressure P within the pressure accumulator 105. In order to measure the pressure in the pressure accumulator 105, a pressure sensor 103 is provided, the pressure sensor transmitting a corresponding measuring signal 113 to the device 101. The pressure P' measured by the measuring sensor 103 is erroneous, and the device 101 is designed to carry out a method for determining the error according to one embodiment.

For this purpose, a certain pressure is first of all set in the pressure reservoir 105 by supplying (not illustrated) fuel or removing fuel 107. Then the following is repeatedly carried out (taking into consideration the above explanations and equations) to check the sensor value for plausibility and determine an error therein:

a) At different real pressure levels $p_i = p_1, p_2, p_3, \ldots$ (the sensor in this case indicates the pressures $p'_i = p'_1, p'_2, p'_3, \ldots$), injections of the durations $t_i = t_1, t_2, t_3, \ldots$ are carried out. The resultantly caused pressure collapses $\Delta p'_i = \Delta p'_1, \Delta p'_2, \Delta p'_3, \ldots$ are measured.

b) From said measured values, the parameters a and b can be determined with reference to equation (XIV).

c) With reference to the parameters a and b, the indicating error of the sensor can be ascertained according to equation (XI). In the event of a correct sensor, a=0 and b=1 would be expected. Deviations therefrom represent an error.

d) Given knowledge of the parameters a and b, an error in the sensor can not only be identified but may optionally also be corrected.

The device 101 has a memory 117 for storing variables which are determined from at least two 3-tuples of a first pressure, of a period of time and of a second pressure (or of a pressure collapse), which have been measured as above.

Figure 2:
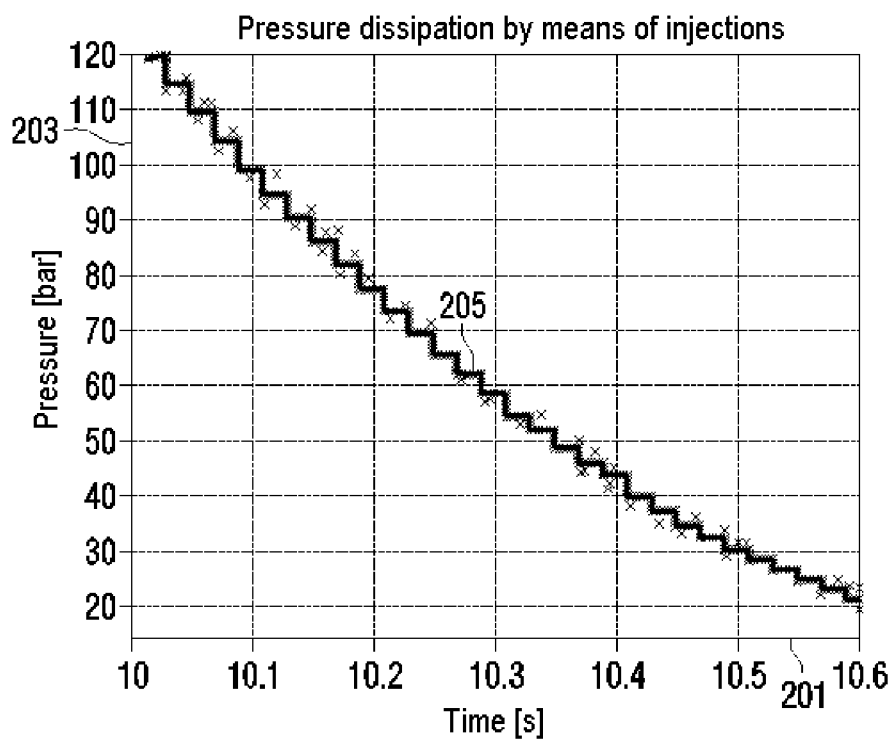
FIG. 2 shows a graph for illustrating measurement results which have been obtained according to a method for determining an error in a pressure, which is measured by means of a pressure sensor, according to an example embodiment of the present disclosure.

FIG. 2 shows a graph of the measured pressure collapses as a function of the time. In FIG. 2, an abscissa 201 indicates the time in seconds and an ordinate 203 indicates the pressure in bar, which has been measured by the pressure gauge 103 within the pressure accumulator 105 (see FIG. 1). The curve 205 shows the stepped pressure collapses.

FIG. 3 shows a graph, wherein an abscissa 301 indicates the pressure in bar and an ordinate 303 indicates the pressure collapse in bar. The crosses 305 represent pairs of values from a first pressure and a difference from a first pressure and a second pressure that have been measured according to certain embodiments. In particular, the pairs of values have been obtained from the curve 205 in FIG. 2.

Under the assumption that the fuel is discharged following Bernoulli's law, it would be the case, for example, that $g(P)=-sqrt(P)$.

Equation (XIV) would then be $$(V*\rho*\Delta P')/(f(t)*E)=-sqrt(b*(P'-a)) \quad (XIV'')$$

The continuous line 307 in FIG. 3 represents a square root function of this type, the parameters of which have been determined with the aid of the method of the equivalent squares. As is apparent, the root function 307 has therefore been readily matched to the pairs of measured values 305. The parameters a and b, and therefore the error in the sensor 103, can be calculated from the shape of the root function 307. In particular, for the value a the value of approximately 12 bar, which is denoted in FIG. 3 by the reference number 309, is obtained. The ready correspondence between the measured pairs of values 305 and the root function 307 also shows that the relevant model assumption that the fuel is discharged according to Bernoulli's law is correct.

As is apparent from FIG. 3, a pressure range 311 of approximately 10 bar to 200 bar is covered. The error in the pressure sensor 103 is therefore determined for this pressure range.

The error determined in the pressure measurement by the pressure gauge or pressure sensor 103 can then be made available to an engine control system in order to activate the inlet or injection valve 109 more accurately via a control line 115 so as to open in order to inject a desired fuel mass from the pressure reservoir 105 into the cylinder.

What is claimed is:

1. A method for controlling fuel injection into one or more cylinders of an internal combustion engine, the method comprising:
   determining an error in a pressure measured by a pressure sensor in a pressure accumulator for accumulating fuel that is removable from the pressure accumulator via an injection valve, and that can be injected into a cylinder by
   determining at least two 3-tuples of: a first pressure, a period of time, and a second pressure, wherein for each 3-tuple:
      the respective first pressure is measured by the pressure sensor;
      after measuring of the first pressure, the injection valve is opened for the respective period of time; and
      after the opening of the injection valve for the period of time, the respective second pressure is measured by the pressure sensor; and
   determining a measured pressure error from the at least two 3-tuples; and
   opening the injection valve for a calculated duration based at least in part on a desired amount of fuel and the determined error in measured pressure;
   wherein the determination of the measured pressure error includes determining parameters of an error model;
   determining the parameters of the error model by matching at least two pairs of measured values to a functional relationship between pressure collapse and pressure; and
   forming a pair of measured values for each 3-tuple, wherein one component of the pair of measured values depends on at least one of the first pressure and the second pressure and another component of the pair of measured values depends on the difference between the first pressure and the second pressure.

2. The method of claim 1, wherein the error model assumes that:

$$P'=a+b*P, \text{ wherein}$$

P' is the measured pressure,
P is the actual pressure, and
a, b are parameters of the error model to be determined.

3. The method of claim 1, wherein:
the functional relationship is determined as a function of a characteristic of the valve, and
the characteristic defines a required opening time for a given mass of the fluid that is to be let out, said fluid in the pressure reservoir being under a given pressure in relation to an external space.

4. The method of claim 1, wherein the functional relationship is given by:

$$(V*\rho*(P1-P2))/(f(t)*E)=b*g((P1-a)/b), \text{ wherein}$$

P1 is the first pressure,
P2 is the second pressure,
V is the volume of the pressure accumulator,
ρ is the mass density of the fluid,
E is the bulk modulus of the fluid,
f(t) and g(P) are real-value functions, wherein g(P) is a known mathematical function and f(t) is known at least by pairs of values,
wherein f(t)*g(P) indicates the mass of fluid that is let out of the pressure reservoir at a pressure P in the pressure reservoir, relative to an external pressure, by opening of the valve for a duration t, and
wherein the duration t is identical to the period of time for which the valve is opened after measuring of the first pressure.

5. The method of claim 4, wherein:

$$g(P)=-sqrt(P).$$

6. The method of claim 4, wherein a pressure dependency of at least one of the mass density (ρ) of the fluid and the bulk modulus (E) of the fluid is taken into consideration.

7. The method of claim 1, wherein the functional relationship is provided by:

$$(V*\rho*(P1-P2))/E=b*gt((P1-a)/b), \text{ wherein}$$

P1 is the first pressure,
P2 is the second pressure,
V is the volume of the pressure accumulator,
ρ is the mass density of the fluid,
E is the bulk modulus of the fluid,
gt(P) is a real-value function which indicates the mass of fluid that is let out of the pressure reservoir at a pressure P in the pressure reservoir, relative to an external pressure, by opening of the valve for a predefined period, wherein in each case the period of time for which the valve is opened after measuring of the first pressure is equal to the predefined duration.

8. A device for controlling fuel injection into one or more cylinders of an internal combustion engine by determining an error in a pressure measured by a pressure sensor in a pressure accumulator for accumulating fuel that is removable from the pressure accumulator via an injection valve, and can be injected into a cylinder, wherein the device comprises:

memory configured to store at least two 3-tuples, each comprising a first pressure measured by the pressure sensor, a corresponding period of time, and a second pressure measured by the pressure sensor;
 a signal input configured, for each 3-tuple, to receive a measuring signal of the respective first pressure measured by the pressure sensor;
 a control output configured, for each 3-tuple, after measuring of the first pressure, to send a control signal to the injection valve to open the valve for the corresponding period of time, wherein after the opening of the injection valve for the corresponding period of time, a measuring signal of the second pressure measured by the pressure sensor is received by the signal input; and
 a processor configured to:
  determine an error of the measured pressure from the at least two 3-tuples;
  calculate a duration of opening for the injection valve based at least in part on a desired amount of fuel and the determined error in measured pressure; and
  deliver a signal including the calculated opening duration for opening the injection valve;
 wherein the determination of the measured pressure error comprises determining parameters of an error model;
 determining the parameters of the error model by matching at least two pairs of measured values to a functional relationship between pressure collapse and pressure; and
 forming a pair of measured values for each 3-tuple, wherein one component of the pair of measured values depends on at least one of the first pressure and the second pressure and another component of the pair of measured values depends on the difference between the first pressure and the second pressure.

9. The device of claim 8, wherein the error model assumes that:

$$P'=a+b*P, \text{ wherein}$$

P' is the measured pressure,
P is the actual pressure, and
a, b are parameters to be determined.

10. The device of claim 8, wherein:
 the functional relationship is determined as a function of a characteristic of the valve, and
 the characteristic defines a required opening time for a given mass of the fluid that is to be let out, said fluid in the pressure reservoir being under a given pressure in relation to an external space.

11. The device of claim 8, wherein the functional relationship is given by:

$$(V*\rho*(P1-P2))/(f(t)*E)=b*g((P1-a)/b), \text{ wherein}$$

P1 is the first pressure,
P2 is the second pressure,
V is the volume of the pressure accumulator,
ρ is the mass density of the fluid,
E is the bulk modulus of the fluid,
f(t) and g(P) are real-value functions, wherein g(P) is a known mathematical function and f(t) is known at least by pairs of values,
wherein f(t)*g(P) indicates the mass of fluid that is let out of the pressure reservoir at a pressure P in the pressure reservoir, relative to an external pressure, by opening of the valve for a duration t, and
wherein the duration t is identical to the period of time for which the valve is opened after measuring of the first pressure.

12. The device of claim 11, wherein:

$$g(P)=-sqrt(P).$$

13. The device of claim 11, wherein a pressure dependency of at least one of the mass density (ρ) of the fluid and the bulk modulus (E) of the fluid is taken into consideration.

14. The device of claim 8, wherein the functional relationship is provided by:

$$(V*\rho*(P1-P2))/E=b*gt((P1-a)/b), \text{ wherein}$$

P1 is the first pressure,
P2 is the second pressure,
V is the volume of the pressure accumulator,
ρ is the mass density of the fluid,
E is the bulk modulus of the fluid,
gt(P) is a real-value function which indicates the mass of fluid that is let out of the pressure reservoir at a pressure P in the pressure reservoir, relative to an external pressure, by opening of the valve for a predefined period,
wherein in each case the period of time for which the valve is opened after measuring of the first pressure is equal to the predefined duration.

* * * * *